(12) United States Patent
Keles et al.

(10) Patent No.: US 10,945,308 B2
(45) Date of Patent: Mar. 9, 2021

(54) RADIO SYSTEM FOR RADIO COMMUNICATION

(71) Applicant: Rohde & Schwarz GmbH & Co. KG, Munich (DE)

(72) Inventors: Mustafa Keles, Munich (DE); Erik Haas, Munich (DE); Manfred Schwarz, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/397,181

(22) Filed: Apr. 29, 2019

(65) Prior Publication Data

US 2020/0344846 A1    Oct. 29, 2020

(51) Int. Cl.
| | | |
|---|---|---|
| H04W 88/08 | (2009.01) | |
| H04B 1/16 | (2006.01) | |
| H04B 7/06 | (2006.01) | |
| H04B 7/08 | (2006.01) | |
| H04B 7/022 | (2017.01) | |
| H04B 7/0413 | (2017.01) | |

(52) U.S. Cl.
CPC ........ H04W 88/085 (2013.01); H04B 1/1615 (2013.01); H04B 7/022 (2013.01); H04B 7/0686 (2013.01); H04B 7/0868 (2013.01); H04B 7/0413 (2013.01)

(58) Field of Classification Search
CPC ... H04B 7/2621; H04B 7/2656; H04B 7/2687
USPC ........................................................ 375/262
See application file for complete search history.

(56) References Cited

U.S. PATENT DOCUMENTS

| | | | | |
|---|---|---|---|---|
| 5,835,855 A * | 11/1998 | Burns | ............... | H04B 7/0822 455/277.1 |
| 6,201,501 B1 * | 3/2001 | Arkko | ............... | H01Q 1/243 343/700 MS |
| 10,693,525 B2 * | 6/2020 | Teggatz | ............... | H04B 5/0037 |
| 2002/0102948 A1 * | 8/2002 | Stanwood | ............... | H04B 7/2621 455/91 |
| 2007/0232344 A1 * | 10/2007 | Aoki | ............... | H04B 7/0874 455/522 |
| 2008/0192855 A1 * | 8/2008 | Shapira | ............... | G01S 3/023 375/267 |
| 2009/0215492 A1 * | 8/2009 | Pistner | ............... | H01B 9/003 455/561 |
| 2010/0109877 A1 * | 5/2010 | Bolling | ............... | G07C 9/22 340/573.1 |
| 2013/0051240 A1 * | 2/2013 | Bhattad | ............... | H04L 5/005 370/241 |
| 2013/0223554 A1 * | 8/2013 | Hong | ............... | H04B 7/0413 375/267 |
| 2015/0109710 A1 * | 4/2015 | Politis | ............... | H02G 15/113 361/119 |
| 2018/0212669 A1 * | 7/2018 | Li | ............... | H04B 7/0814 |

* cited by examiner

*Primary Examiner* — Shuwang Liu
*Assistant Examiner* — Gina M McKie
(74) *Attorney, Agent, or Firm* — Schwabe, Williamson & Wyatt, P.C.

(57) ABSTRACT

A radio system for radio communication comprises at least two antennas that are spaced from each other by a distance. The distance is set to enable independent transmission or reception of radio signals via the at least two antennas. The system comprises a selection module configured to select at least one of the at least two antennas for radio transmission and/or radio reception.

15 Claims, 1 Drawing Sheet

RADIO SYSTEM FOR RADIO COMMUNICATION

FIELD OF THE DISCLOSURE

Embodiments of the present disclosure relate generally to a radio system for radio communication.

BACKGROUND

In radio systems known in the prior art, for instance tactical communication systems, transmit diversity and/or receive diversity cannot be applied, as the frequency ranges used would require large antenna distances to achieve diversity gains. Usually, the antenna distances required cannot be established by the radio systems, for instance within a handheld radio instrument.

Further, antenna devices, namely antenna arrangements, used by radio systems for radio communication may be located remotely with respect to the radio that processes the radio signals. Therefore, the antenna devices are connectable to the respective radio that may be positioned in a distance of several hundred meters with respect to the corresponding antenna device, for instance more than 1 km. In fact, the distance between the respective antenna device and the radio ensures that geographic circumstances on-site like mountains or forests influencing the radio communication properties can be handled by the radio system, as the respective antenna device is located at a position that ensures good transmission and/or receiving properties with regard to radio communication.

The antenna device and the radio are connected with each other via a cable connection that has to be configured to transmit energy as well as a data stream. Typically, copper cables are used that connect the antenna device to the radio at a distant location. Then, alternate current signals are transmitted via the conventional copper cables, which inter alia provide the energy required for operating the antenna device located remotely as well as the data. However, the alternate current signals produce electromagnetic radiation that can be detected easily.

Accordingly, there is a need for a radio system that overcomes the above-mentioned drawbacks.

SUMMARY

Embodiments of the present disclosure provide a radio system for radio communication, comprising at least two antennas that are spaced from each other by a distance. The distance is set to enable independent transmission or reception of radio signals via the at least two antennas. The system comprises a selection module that is configured to select at least one of the at least two antennas for radio transmission and/or radio reception.

Accordingly, the selection module is enabled to decide which antenna configuration of the radio system, namely which of the at least two antennas, enables the best connection for radio communication purposes. Then, the respective antenna configuration is used for radio communication. For instance, the first antenna is selected via the selection module, the second antenna is selected via the selection module or both antennas are selected via the selection module. The respective selection may be done for receiving radio signals as well as for transmitting radio signals.

The distance enabling independent transmission or reception of radio signals via the at least two antennas may be at least the half wavelength of the respective radio signal used for radio communication.

For instance, a VHF (Very High Frequency) radio signal may have a frequency of 30 MHz resulting in a wavelength of approximately 10 m. For this frequency, the distance between the at least two antennas should be at least 5 m in order to ensure diversity gains.

The diversity gains achieved may relate to transmit diversity and/or receive diversity. The respective diversity gain may inter alia depend on the respective antenna configuration used for receiving or transmitting radio signals.

Generally, the radio signals may have a frequency assigned to the VHF range or rather the UHF range. For instance, the frequency range used is 30 MHz to 512 MHz.

An aspect provides that the radio system comprises at least one remote antenna device having at least one of the at least two antennas. Hence, the at least one remote antenna device may be located distanced with respect to the other antenna such that diversity can be achieved. For instance, the best radio connection between the two distant locations of the antennas can be selected via the selection module.

The antenna device may also comprise an amplifier module. The amplifier module may be necessary for amplifying the radio signal to be transmitted.

Particularly, the at least one remote antenna device comprises a transceiver. The transceiver may ensure that the at least one remote antenna device is configured to transmit radio signals and to receive radio signals. This may depend on the respective operation mode of the remote antenna device. Thus, radio signals may be received via the at least one remote antenna device or rather transmitted via the at least one remote antenna device.

Another aspect provides that the radio system comprises a radio having at least one of the at least two antennas. Thus, the radio may have one antenna whereas the remote antenna device that is located remotely with respect to the radio comprises the other of the at least two antennas. Therefore, two different locations for the at least two antennas of the radio system are provided wherein different transmission properties or receiving properties with regard to the radio communication may be assigned to the different locations. Therefore, the best antenna configuration for the intended radio communication(s) may be selected via the selection module.

Put another way, the radio and the remote antenna device are formed separately. In fact, they may be distanced from each other by several meters.

Particularly, the radio comprises a signal and/or waveform processing unit. The signal and/or waveform processing unit may provide a certain waveform and/or signal to be transmitted. Further, the signal and/or waveform processing unit may be configured to receive and analyze (process) a certain signal and/or waveform received via at least one of the antennas. Thus, the radio system is enabled to optimize and evaluate the transmitted and/or received radio signals.

Further, the radio may comprise a transceiver. Accordingly, the radio is also configured to receive and/or transmit radio signals, particularly without the need of the remote antenna device.

Thus, the entire radio system may comprise two transceivers, as the at least one remote antenna device as well as the radio each comprise one transceiver. Put another way, two remotely located transceivers are provided by the radio system.

The at least one remote antenna device and the radio may be connected with each other. The connection may ensure exchange of energy and/or a data stream between the radio and the remote antenna device. The data stream may be associated with the radio signal and/or waveform.

In fact, the remote antenna device, particularly its antenna, may be connected to the same signal and/or waveform processing unit as the one of the radio due to the connection provided between the at least one remote antenna device and the radio.

Hence, the two remotely located transceivers are connected to the same signal and/or waveform processing unit even though they are distanced by several (hundred) meters.

For instance, the radio and the at least one remote antenna device are connected with each other via a cable connection established by a hybrid cable connection. The hybrid cable connection comprises a direct current link to transmit energy and an optical link to transmit a data stream. Therefore, the energy required by the remote antenna device is provided by direct current via the direct current link (DC link), whereas the respective data assigned to the data stream is transmitted in an optical manner. Therefore, high data rates can be achieved. Simultaneously, the cable connection established between the radio and the remote antenna device cannot be detected easily, as the direct current signals do not produce electromagnetic radiation in contrast to alternate current signals.

Another aspect provides that the system comprises a remote adapter. The remote adapter may be assigned to the radio. For instance, the remote adapter is separately formed with respect to the radio, but connected to the radio for expanding the functionality of the radio. Alternatively, the remote adapter may be integrated within the radio in order to provide an interface for the at least one remote antenna device. The at least one remote antenna device may be connected with the remote adapter such that the at least one remote antenna device is connected to the radio via the remote adapter.

The distance may be adjustable between one meter and several hundred meters. Thus, the radio system can be mounted on a vehicle, as both antennas are only distanced from each other by one meter, for instance. Furthermore, the radio system may also be used in the terrain since the remote antenna device may be located several hundred meters apart from the radio to which the remote antenna device is connected.

For instance, the at least one remote antenna device is a remote radio head. The remote radio head may comprise at least one antenna as well as at least one amplifier module that is used for operating the remote antenna device.

Generally, four different transmit options are provided by the radio system having at least two antennas.

First, a radio signal is transmitted only via the first antenna, for instance the radio. Second, a radio signal is transmitted only via the second antenna, for instance the remote antenna device. Third, a radio signal is transmitted via the first antenna or the second antenna (depending on the selection done by the selection module), namely via the radio or the remote antenna device. Fourth, a radio signal is transmitted via the first antenna and the second antenna in parallel, namely the radio and the remote antenna device.

The first two transmit options mentioned above (options 1 and 2) do not provide any diversity, as the radio signals are always transmitted via the respective antenna irrespective of the radio communication properties of the respective antenna used. Put another way, the radio signals are transmitted by the radio or rather the remote antenna device irrespective of the location of the radio and/or the remote antenna device as well as the corresponding communication properties assigned thereto.

However, the last options mentioned above (options 3 and 4) provide diversity gain. In fact, transmit diversity with selection diversity (transmit option 3) as well as transmit diversity with delay diversity (transmit option 4) are provided.

In a similar manner, four different receive options are provided by the radio system having at least two antennas.

First, a radio signal is received only via the first antenna, for instance the one assigned to the radio. Second, a radio signal is received only via the second antenna, for instance the one assigned to the remote antenna device. Third, a radio signal is received via the first antenna or the second antenna (depending on the selection done by the selection module), namely the radio or the remote antenna device. Fourth, a radio signal is received via the first antenna and the second antenna in parallel. Hence, the radio and the remote antenna device both receive radio signals.

The first two receive options mentioned above (options 1 and 2) do not provide any diversity, as the radio signals are always received via the respective antenna irrespective of the radio communication properties of the respective antenna used. In other words, the radio signals are received by the radio or rather the remote antenna device irrespective of the location of the radio and/or the remote antenna device as well as the corresponding communication properties assigned thereto.

However, the last options mentioned above (options 3 and 4) provide diversity gain. In fact, receive diversity with selection diversity (receive option 3) as well as receive diversity with delay diversity (receive option 4) are provided.

The receive diversity with delay diversity (receive option 4) may come together with a combing of the respective signals received via the at least two antennas, for instance a maximal ratio combining, an equal gain combining or an additive combining.

In fact, the radio system can be used differently, namely as a Multiple Input Single Output (MISO) system, a Single Input Multiple Output (SIMO) system or a Multiple Input Multiple Output (MIMO) system. In other words, the MISO system is assigned to transmit diversity, the SIMO system is assigned to receive diversity and the MIMO system is assigned to transmit and receive diversities.

Accordingly, the radio system is configured to be operated as a MISO system, a SIMO system or rather a MIMO system. The respective setup used for radio communication may be selected automatically or rather manually by a user or an operator of the radio system.

The respective setup used may inter alia depend on the antenna arrangement/configuration selected, particularly via the selection module.

Further, the radio system, particularly the selection module, may be configured to combine the signals received by the at least two antennas simultaneously. This may be done in the SIMO or rather MIMO setup of the radio system.

In fact, the SIMO setup ensures receive diversity. Further, the SIMO setup is enabled for multicast transmission, for instance Point-to-Multipoint transmission, which is typically used.

Regarding transmit diversity, selection diversity may be achieved by manually selecting the (alleged) best possible transmitting location for all radio communications, namely manually selecting one of the at least two antennas for transmitting the radio signals.

However, the selection diversity may also be obtained by automatically selecting the best possible transmitting location.

In case there are multiple receivers (Point-to-Multipoint (PtM) transmission), selection diversity may be achieved by selecting the respective transmitting antenna by means of an algorithm that selects the respective transmitting antenna with regard to average best received signals.

In case there is a single receiver (Point-to-Point (PtP) transmission), selection diversity may be achieved by selecting the respective transmitting antenna with an algorithm that also selects the respective transmitting antenna with regard to best results.

The respective algorithm may take Received Signal Strength Indicators (RSSI) and/or signal-to-noise ratio (SNR) into account.

The algorithm mentioned above used for selecting the best possible location for transmission may take average RSSI assigned to the at least two antennas in a receive mode of the radio system into account for the respective or rather all receiver(s) assigned to the radio system depending on the transmission mode, for instance PtM or rather PtP transmission mode. Alternatively or additionally, an open loop waveform evaluation of RSSI and SNR assigned to the at least two antennas may be done for the respective or rather all receiver(s) assigned to the radio system depending on the respective transmission mode. Alternatively or additionally, a closed loop feedback is provided from the respective or rather all receiver(s) assigned to the radio system depending on the respective transmission mode.

Moreover, the radio signals may be transmitted in parallel which results in a delay diversity that occurs between the radio signals transmitted by the at least two antennas distanced with respect to each other. This leads to a frequency-selectivity.

Regarding receive diversity, selection diversity may be achieved by manually selecting the (alleged) best possible receiver location for all radio communications, namely manually selecting one of the at least two antennas for receiving the radio signals.

However, the selection diversity may also be obtained by automatically selecting the best possible receiving location, namely the respective antenna location with respect to radio communication properties.

In fact, selection diversity may be achieved by selecting the antenna location by means of an algorithm. The respective algorithm may also take Received Signal Strength Indicators (RSSI) and/or signal-to-noise ratio (SNR) into account.

In addition, combing of the radio signals may take place provided that radio signals are received via the at least two antennas (simultaneously). Put another way, combing of the radio signals may take place in case that both antennas are selected for receiving purposes.

For instance, a maximal ratio combing of the received signals may take place, which requires knowledge about the SNR and phase of the respective communication channel(s) established by the antenna(s) or rather the radio signals.

Further, equal gain combining may take place according to which the received signals are summed up coherently. This requires knowledge about the phase of the radio signals.

The SNR may be estimated by evaluation of the RSSI combined with the noise figure of the receiver and bandwidth of the respective waveform of the radio signals. Alternatively or additionally, the waveform of the radio signals may be evaluated.

The phase may be estimated by evaluating the waveform of the radio signals.

However, knowledge of the phase is not needed for large bandwidth waveforms due to the delay diversity that takes place in the respective operation mode.

In addition, additive combing may take place according to which the received signals are simply summed up. However, simple summing might be constructive and deconstructive, as the phase is not taken into account.

Further, embodiments of the present disclosure provide a radio system for radio communication, comprising a radio and at least one remote antenna device with an amplifier module for operating the remote antenna device. The radio and the at least one remote antenna device are connected with each other via a cable connection. The cable connection is a hybrid cable connection. The hybrid cable connection comprises a direct current link to transmit energy and an optical link to transmit a data stream.

Accordingly, high data rates can be exchanged between the radio and the at least one remote antenna device due to the optical link provided. Simultaneously, the signals exchanged cannot be detected easily, as a direct current is used for energy transmission instead of an alternate current that produces electromagnetic radiation which can be detected easily.

An aspect provides that the direct current link is configured to transmit energy from the radio to the at least one remote antenna device. Hence, the at least one remote antenna device is supplied with energy required via the direct current link.

For instance, the direct current link is configured to transmit energy from the radio to the amplifier module of the at least one remote antenna device. Thus, the amplifier module of the remote antenna device is supplied with the energy required in an appropriate manner.

Moreover, the optical link may be configured to transmit the data stream to and/or from the remote antenna device. Hence, data is exchanged between the radio and the remote antenna device in a bidirectional manner, as the remote antenna device is generally configured to receive and/or transmit radio signals.

The remote antenna device may be a remote radio head. The remote radio head, also called RRH, is a compact remote antenna device that can be used in terrain applications.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
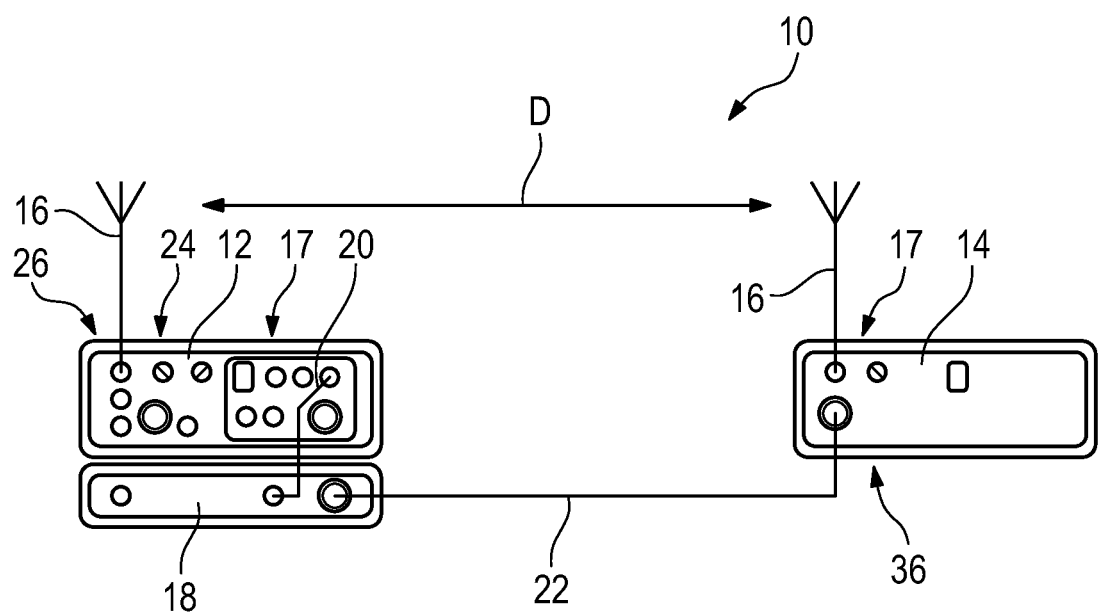
FIG. 1 schematically shows a representative embodiment of a radio system according to the present disclosure.

FIG. 1 schematically shows a radio system 10 for radio communication, which comprises a radio 12 as well as at least one remote antenna device 14.

The radio 12 as well as the at least one remote antenna device 14 each have at least one antenna 16. Thus, the radio system 10 shown in FIG. 1 comprises at least two antennas 16.

In general, the radio 12 as well as the at least one remote antenna device 14 each comprise a transceiver 17 such that the radio 12 and the remote antenna device 14 each are configured to receive and to transmit radio signals. Put another way, the radio 12 and the remote antenna device 14 may be operated in different modes, namely a transmission mode or a reception mode. The respective transceiver 17 may be integrated in the respective device.

Accordingly, the radio system 10 has two transceivers 17.

The radio 12 and the at least one remote antenna device 14 are located at different positions such that the at least two antennas 16 are spaced from each other by a distance D that is set to enable independent transmission or reception of radio signals via the at least two antennas 16.

The radio system 10 further comprises a remote adapter 18 that is assigned to the radio 12. The remote adapter 18 is connected to the radio 12 as well as the remote antenna device 14.

Figure 2:
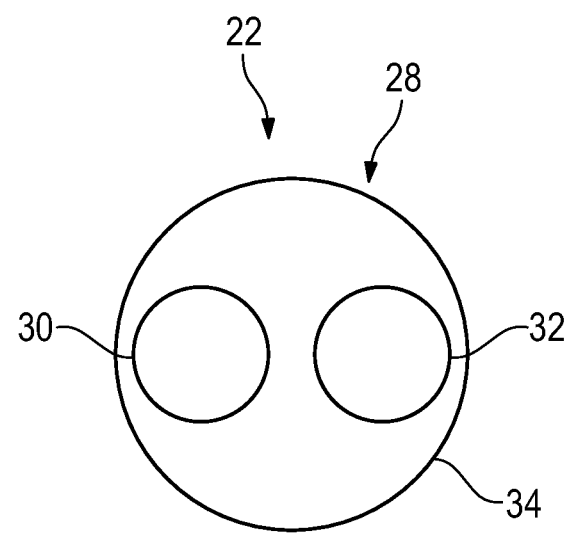
FIG. 2 schematically shows a cross-sectional view of the cable connection used by the radio system of FIG. 1.

In the shown embodiment, the remote adapter 18 is connected to the radio 12 via a relay line 20 connected to a relay interface of the radio 12, whereas the remote adapter 18 is connected to the remote antenna device 14 via a cable connection 22 that is shown in FIG. 2 in more detail.

Generally, the radio system 10 comprises a signal and/or waveform processing unit 24.

In the shown embodiment, the signal and/or waveform processing unit 24 is integrated in the radio 12.

As the remote antenna device 14 is connected to the radio 12, the at least one remote antenna device 14 is also connected to the signal and/or waveform processing unit 24. Particularly, the connection is established via the cable connection 22, the remote adapter 18 as well as the relay line 20 even though the remote antenna device 14 is located remotely with respect to the radio 12, particularly the signal and/or waveform processing unit 24.

The radio system 10, particularly the radio 12, comprise a selection module 26 that is configured to select one of the at least two antennas 16 for radio transmission and/or reception. For instance, one of both antennas 16 may be actively selected for radio transmission or rather radio reception. Hence, the selection module 26 may also select both antennas 16 for radio transmission or rather radio reception.

In other words, the selection module 26 is configured to combine the radio signals received via the at least two antennas 16.

In addition, the selection module 26 is configured to transmit radio signals via the at least two antennas 16 in parallel.

Generally, the best antenna configuration is (automatically) selected such that the best radio connection can be chosen for the radio system 10. This is ensured by the selection module 28.

In fact, the radio system 10 may be operated as a Single Input Multiple Output (SIMO), Multiple Input Single Output (MISO) or rather Multiple Input Multiple Output (MIMO) radio system 10.

The selection module 26 and the signal and/or waveform processing unit 24 may be established by a common control and processing module of the radio 12.

In general, the distance D between the at least two antennas 16, namely the distance D between the at least one remote antenna device 14 as well as the radio 12, can be set by an operator or rather user of the radio system 10. The respective distance D set may depend on the frequency used by the radio signals.

The distance may be approximately 1 meter in case that the antennas 16 are located on a vehicle or rather sever hundred meters up to more than 1 km in case that the remote antenna device 14 is located on a mountain.

In fact, the distance D may also depend on the specific application intended.

As already mentioned above, the radio 12 and the at least one antenna device 14 may be connected with each other via the cable connection 22 that is established by a hybrid cable connection 28 shown in FIG. 2 in more detail.

The hybrid cable connection 28 comprises a direct current link 30, which is configured to transmit energy via a direct current, as well as an optical link 32 that is configured to transmit a data stream.

In the shown embodiment, the direct current link 30 and the optical link 32 are located in a common sleeve 34. The common sleeve 34 may have electromagnetic shielding properties. However, the direct current link 30 and the optical link 32 of the cable connection 22 may also be formed separately from each other.

Generally, the energy may be forwarded from the radio 12, particularly the assigned remote adapter 18, to the at least one remote antenna device 14 that may comprise an amplifier module 36 that requires energy for operation purposes. The amplifier module 36 may be integrated within the remote antenna device 14.

The optical link 32 ensures high data rates with regard to the data stream exchanged between the radio 12 and the at least one remote antenna device 14. As the at least one remote antenna device 14 as well as the radio 12 each comprise transceivers 17, the optical link 32 ensures a bidirectional communication between the radio 12 and the at least one remote antenna device 14.

In fact, the data exchanged may be assigned to a radio signal received by the at least one remote antenna device 14 or rather a radio signal to be transmitted via the at least one remote antenna device 14.

Since the energy for operating the at least one remote antenna device 14 is forwarded to the at least one remote antenna device 14 via the direct current link 30, it is ensured that no electromagnetic radiation is produced in contrast to alternate current signals used for energy and/or data transmission.

The invention claimed is:

1. A radio system for radio communication, comprising at least two antennas that are spaced from each other by a distance, the distance being set to enable independent transmission or reception of radio signals via the at least two antennas, the system comprising a selection module configured to select at least one of the at least two antennas for radio transmission or radio reception, wherein the radio system comprises at least one remote antenna device having at least one of the at least two antennas, wherein the radio system comprises a radio having at least one of the at least two antennas, wherein the at least one remote antenna device and the radio are connected with each other, and wherein in a first operation mode, only a first antenna of the at least two antennas is selected via the selection module for either transmitting a radio signal only via the first antenna or receiving a radio signal only via the first antenna, in a second operation mode, a second antenna of the at least two antennas is selected via the selection module for either transmitting a radio signal only via the second antenna or receiving a radio signal only via the second antenna, and in a third operation mode, both the first antenna and the second antennas are selected via the selection module for either transmitting a radio signal via the first antenna and the second antenna in parallel or receiving a radio signal via the first antenna and the second antenna in parallel, such that a best antenna configuration for the intended radio communication is selected via the selection module.

2. The radio system according to claim 1, wherein at least one of the least two antennas comprises a transceiver.

3. The radio system according to claim 1, wherein the radio comprises a signal and/or waveform processing unit.

4. The radio system according to claim 1, wherein the radio comprises a transceiver.

5. The radio system according to claim 1, wherein the radio and the at least one of the least two antennas are connected with each other via a cable connection, the cable connection being a hybrid cable connection, the hybrid cable connection comprising a direct current link to transmit energy and an optical link to transmit a data stream.

6. The radio system according to claim 1, wherein the system comprises a remote adapter.

7. The radio system according to claim 1, wherein the distance is adjustable between 1 meter and several hundred meters.

8. The radio system according to claim 1, wherein the at least one of the least two antennas is a remote radio head.

9. A radio system for radio communication, the radio system comprising a radio and at least one remote antenna device with an amplifier module for operating the remote antenna device, the radio and the at least one remote antenna device being connected with each other via a cable connection, the cable connection being a hybrid cable connection, the hybrid cable connection comprising a direct current link to transmit energy and an optical link to transmit a data stream, the radio having a least one antenna and a transceiver, and the at least one remote antenna device having at least one antenna, a transceiver and a signal and/or waveform processing unit configured to provide a certain waveform and/or signal to be transmitted or to receive and analyze a certain signal and/or waveform received, wherein the antennas of the radio and the at least one remote antenna device both are connected to the same signal and/or waveform processing unit, wherein the system comprises a selection module configured to select at least one of the antennas of the radio and the at least one remote antenna device for either radio transmission or radio reception, and wherein the selection module is configured to combine the signals received by the antennas of the radio and the at least one remote antenna device simultaneously.

10. The radio system according to claim 9, wherein the direct current link is configured to transmit energy from the radio to the at least one remote antenna device.

11. The radio system according to claim 9, wherein the direct current link is configured to transmit energy from the radio to the amplifier module of the at least one remote antenna device.

12. The radio system according to claim 9, wherein the optical link is configured to transmit the data stream to and/or from the remote antenna device.

13. The radio system according to claim 9, wherein the remote antenna device is a remote radio head.

14. A radio system for radio communication, comprising at least two antennas that are spaced from each other by a distance, the distance being set to enable independent transmission or reception of radio signals via the at least two antennas, the distance between the at least two antennas being at least 5 m such that two different locations for the at least two antennas of the radio system are provided wherein different transmission properties or receiving properties with regard to the radio communication are assigned to the different locations, the system comprising a selection module configured to select at least one of the at least two antennas for radio transmission or radio reception, the radio having at least one antenna, a transceiver and an amplifier module, the at least one remote antenna device having at least one antenna, a transceiver and an amplifier module, and wherein a best radio connection between the two distant locations of the antennas is selected via the selection module, as the selection module is enabled to decide which of the at least two antennas enables the best connection for radio communication.

15. The radio system according to claim 14, wherein the selection module is configured to combine the radio signals received via the at least two antennas and/or to transmit radio signals via the at least two antennas in parallel.

* * * * *